May 21, 1935.  W. B. ZIMMERMAN  2,002,484

GARDEN RAKE TOOTH CLEANING APPLIANCE

Filed Nov. 4, 1933

Inventor
Walter B. Zimmerman
By
Fred B. Fetherstonhaugh
Eugene Stevens

Patented May 21, 1935

2,002,484

UNITED STATES PATENT OFFICE 2,002,484

GARDEN RAKE TOOTH CLEANING APPLIANCE

Walter B. Zimmerman, Winnipeg, Manitoba, Canada

Application November 4, 1933, Serial No. 696,719

3 Claims. (Cl. 55—146)

The invention relates to improvements in garden rake tooth cleaning appliances and an object of the invention is to provide a cleaning device attached to the rake and normally held in a position which will be clear of the teeth of said rake together with manually operated mechanism which will enable the cleaning device to oscillate up and down against the back of the teeth for the purpose of disengaging grass, weeds, etc. therefrom.

A further object of the invention is to provide a hand trigger at a convenient point on the handle so that the person using the rake can readily manipulate the trigger when necessary to remove the accumulation between the teeth.

A further object of the invention is to arrange the cleaning mechanism upon a pivot so that the said cleaner naturally follows the arcuate path conforming to the curve of the teeth of the rake.

A further object of the invention is to provide cleaning mechanism of rigid construction which will not easily become distorted and useless. A further object is to construct the various parts in a simple, durable and inexpensive manner.

With the above more important objects in view, the invention consists essentially in the arrangement and construction of parts hereinafter more particularly described, reference being had to the accompanying drawing, in which:—

In the drawing like characters of reference indicate corresponding parts in the several figures.

It has been found most practicable in this type of cleaner to manufacture the head of the rake and the teeth extending therefrom of relatively thin but strong plate such as steel plate and I have shown such a construction in the accompanying drawing.

Figures 5, 6:
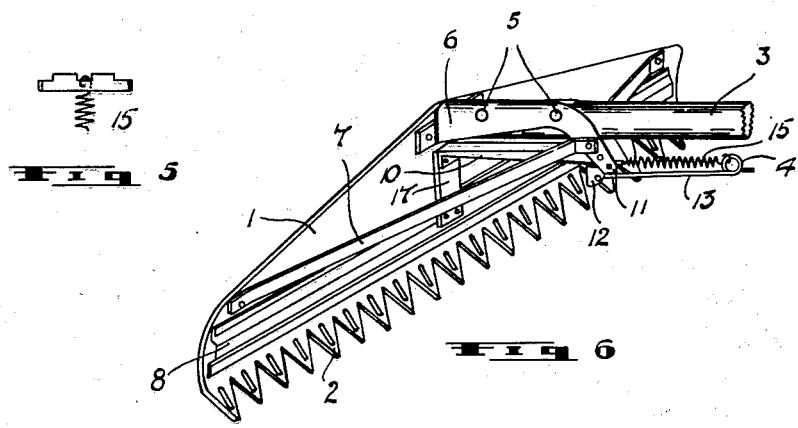
Fig. 5 is a detail showing the means by which the coil spring is attached to the mechanism associated with the cleaning bar.
Fig. 6 is a perspective view of all the mechanism of my rake excepting the trigger.

The head of the rake 1 has the rake teeth 2 formed by cutting the lower edge of the plate to provide the teeth in the manner best shown in Figure 6 and here it will be observed that the teeth are curved and comparatively sharp. The rake handle 3 which is of the ordinary length, has the forward end thereof fastened to the head by means of a screw 4. A metal stock 6 is provided with two drillings 5 which extend through the handle and extends downwardly in the form of two wings in the manner shown in the accompanying drawing. The ends of the head plate are braced to the handle by means of angle braces 7 extending between the metal stock and the ends of the head and suitably secured thereto.

Figures 3, 4:
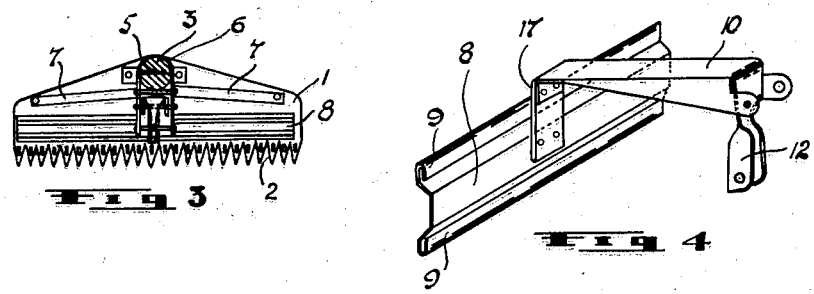
Fig. 3 is a view looking towards the head of the rake on the line 3—3 of Figure 2.
Fig. 4 is a perspective view of the cleaning device and mounting.

The cleaner 8 is formed from a metallic strip of the same length as the head and having its upper and lower edges beaded as at 9, most clearly shown in Figure 4. It is also stamped to the configuration shown in the accompanying drawing which will prevent it from becoming easily misshapen under continual use. The width of the cleaner is such that when it is in its up position, the lower edge thereof just clears the upper ends of the rake teeth and the flange in the manner illustrated in Figure 1.

The cleaner swings with the member 10 on a pivot 11, the orifice through which said pivot extends being clearly shown in Figure 4. The member 10 is curved at right angles to form an extension 12 to which a thin steel rod 13 is attached. This rod is looped as at 14 to receive a coil spring 15, the opposite end of which is attached to the metal stock in the manner illustrated in Figure 5 while the opposite end of the thin steel rod is attached to a trigger 16 suitably pivoted upon the handle. It will thus be seen that when the trigger is actuated from the position shown in Figure 1 to the position shown in Figure 2 that the cleaner will move upon the pivot 11 and follow the arcuate path presented by the head of the cleaner and its associated teeth.

It should be noted here that the cleaning bar 8 is attached to the member 10 by means of a piece of spring steel 17 which operates to keep the cleaning bar in constant contact with the teeth of the rake.

Figure 1:
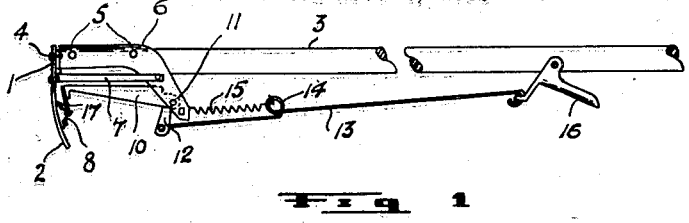
Fig. 1 is a side view of my rake showing the pivoted cleaning device in its normal upward position.
Figure 2:
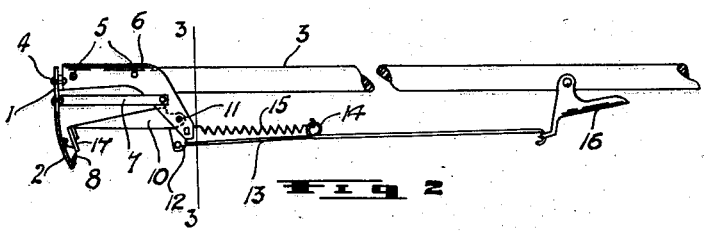
Fig. 2 is a view similar to Figure 1 but showing the cleaner in the downward position.

It will be apparent from the above description that the spring 15 operates to hold the parts in the non-operating position shown in Figure 1 with the cleaner in its up position or clear of the rake teeth and that it is an easy matter to sweep across the teeth of the rake by pressing said trigger towards the rake handle.

The device is very quick and positive in its action and I have found that if one rakes with the usual movement and presses the trigger quickly towards the handle just as the rake is being cleared from the ground on the raking stroke, all débris will be not only cleared from the rake teeth but also shot a short distance and no time will be lost in doing the work.

One can manipulate the trigger to hold the cleaner in any desired position with respect to the rake teeth and the position in which the cleaner is held will obviously limit the depth which the teeth of the rake can penetrate. Accordingly the raking of new and tender grass can be carried on with little or no damage.

Further than this, the parts are so designed that when the trigger is tightly against the handle, the lower edge of the cleaner is beyond the teeth of the rake and by holding the cleaner in this position, one can gather a stack of grass or weeds for instance without using the teeth and thus draw it over a roadway or the like without damage to the teeth or raking the roadway.

While I have described the device in detail, it will be readily understood that various structural changes could be made without departing from the spirit of the invention as set forth in the accompanying claims.

What I claim as my invention is:—

1. The combination with a handle, a headstock attached to said handle and a curved rake head secured thereto and provided with teeth, of a cleaning bar located to the inner side of the head and pivotally connected to said headstock, a hand trigger pivotally attached to the end of the handle remote from the head, an operating connection between the trigger and the cleaning bar to shift said cleaning bar on its pivot in an arcuate path following the curve of said rake head and teeth to clean said teeth, means normally holding the cleaning bar in an elevated position in regard to the teeth and means co-acting with said bar and said operating connection to yieldably press the bar towards the rake head as it passes downwardly towards the points of the teeth.

2. A rake comprising a handle, a headstock attached thereto, a curved rake head and associated teeth secured permanently at one end of the handle, a pivotally mounted cleaning bar located to the inner side of the head and mounted upon said headstock for downwardly shifting movement in relation to the teeth, spring means normally holding the bar in an elevated position clear of the teeth, a hand trigger located on the end of the handle remote from the rake head, an operating connection between the trigger and the headstock adapted in the pressing of the trigger towards the handle to move the bar downwardly and spring means engageable with the down moving bar and said operating connection to yieldably hold said bar against the teeth.

3. A self-cleaning garden rake comprising, in combination, a rake head and teeth integral with said rake head, said rake head and teeth being curved over the breadth of the teeth and partially curved over the breadth of the head, said rake head being attached to a handle, a metal stock curved around said handle and extending downwardly therefrom, a cleaning bar pivotally mounted on the extension of said metal stock, a spring steel connection between said cleaning bar and its mounting to urge said cleaning bar against the rake head and associated teeth, means for moving the cleaning bar in an arcuate path upon its pivot over the curved breadth of said teeth and rake head comprising a coil compression spring attached to the extension of said metal stock and to a bar extending from a member attached to the cleaning bar mounting, the opposite end of said bar being attached to a trigger mounted at a convenient point for manual operation upon the handle, said cleaning bar having beaded edges and pressed throughout its length to an angular configuration thereby increasing its resistance to distortion.

WALTER B. ZIMMERMAN.